US012746804B2

(12) United States Patent
Seidl et al.

(10) Patent No.: US 12,746,804 B2
(45) Date of Patent: Sep. 29, 2026

(54) ARRANGEMENT FOR A VEHICLE ROOF AND VEHICLE ROOF

(71) Applicant: Webasto SE, Stockdorf (DE)

(72) Inventors: Richard Seidl, Stockdorf (DE); Jan Rolwes, Stockdorf (DE); Julian Knöpfle, Stockdorf (DE); Maciej Kaczmarek, Stockdorf (DE); Ludwig Stigler, Stockdorf (DE)

(73) Assignee: WEBASTO SE, Stockdorf (DE)

(*) Notice: Subject to any disclaimer, the term of this patent is extended or adjusted under 35 U.S.C. 154(b) by 411 days.

(21) Appl. No.: 18/292,581

(22) PCT Filed: Aug. 6, 2021

(86) PCT No.: PCT/EP2021/072071

§ 371 (c)(1),
(2) Date: Aug. 12, 2024

(87) PCT Pub. No.: WO2023/011736

PCT Pub. Date: Feb. 9, 2023

(65) Prior Publication Data

US 2025/0153550 A1 May 15, 2025

(51) Int. Cl.
*B60J 7/043* (2006.01)

(52) U.S. Cl.
CPC .................................. *B60J 7/0435* (2013.01)

(58) Field of Classification Search
CPC ............................... B60J 7/0435; B60J 7/024
See application file for complete search history.

(56) References Cited

U.S. PATENT DOCUMENTS

| | | | | |
|---|---|---|---|---|
| 5,730,487 | A | 3/1998 | Hausrath | |
| 7,681,944 | B2 * | 3/2010 | Mooney | B60J 7/0435 296/224 |
| 8,282,159 | B2 * | 10/2012 | Hirata | B60J 7/0435 296/217 |
| 9,415,665 | B2 * | 8/2016 | Nellen | B60J 7/024 |

(Continued)

FOREIGN PATENT DOCUMENTS

| | | | |
|---|---|---|---|
| DE | 19713347 | C1 | 5/1999 |
| DE | 102009052622 | A1 | 5/2011 |

(Continued)

OTHER PUBLICATIONS

Notice of Allowance issued in corresponding Japanese Application No. JP 2024507028; mailed Sep. 2, 2025 ; In Japanese with English machine translation (6 pages).

(Continued)

*Primary Examiner* — Huan Le
(74) *Attorney, Agent, or Firm* — Fitch, Even, Tabin & Flannery, LLP

(57) ABSTRACT

An arrangement for a vehicle roof with a roof opening has a deployment lever with a displacement slider which is pivotable relative to a guide rail. The deployment lever has a first coupling to the guide rail and a second coupling to the guide rail. The second coupling has a lever slotted track in the deployment lever and a sliding pin on the guide rail which is guided in the lever slotted track. The second coupling is arranged between the first coupling and the displacement slider in the longitudinal direction (X).

16 Claims, 11 Drawing Sheets

(56) References Cited

U.S. PATENT DOCUMENTS

Figure 1:
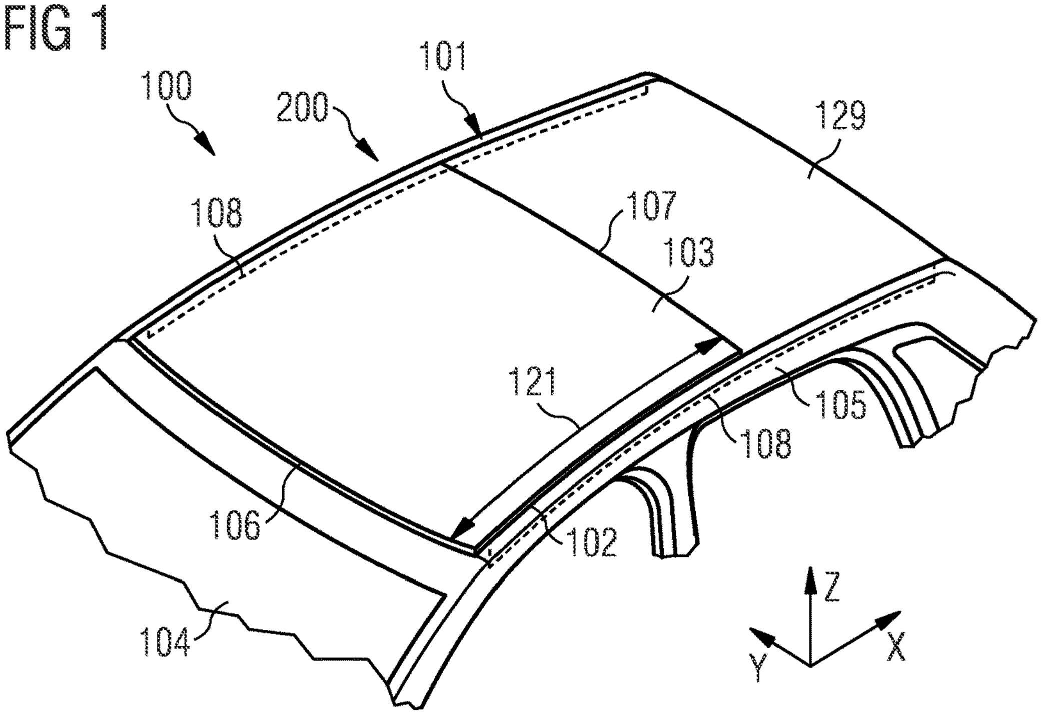

| | | | | |
|---|---|---|---|---|
| 10,035,407 | B2 * | 7/2018 | Serneels | B60J 7/057 |
| 2009/0160223 | A1 | 6/2009 | Grimm | |
| 2017/0158036 | A1 | 6/2017 | Nellen | |
| 2018/0099547 | A1 | 4/2018 | Biewer | |
| 2019/0126733 | A1 | 5/2019 | Beelen | |

FOREIGN PATENT DOCUMENTS

| | | | |
|---|---|---|---|
| DE | 102012106545 | A1 | 1/2014 |
| EP | 2072304 | A1 | 6/2009 |
| EP | 3176017 | A1 | 6/2017 |
| EP | 3476632 | A1 | 5/2019 |
| JP | S6052123 | U | 4/1985 |
| JP | S6368423 | A | 3/1988 |
| JP | H08511492 | A | 12/1996 |

OTHER PUBLICATIONS

ISR and Written Opinion issued against corresponding Application No. PCT/EP2021/072071; mailed Apr. 21, 2022; In German with English Machine Translation (24 pages).

* cited by examiner

ARRANGEMENT FOR A VEHICLE ROOF AND VEHICLE ROOF

CROSS-REFERENCE TO RELATED APPLICATIONS

This application is a U.S. national phase application filed under 35 U.S.C. § 371 of International Application No. PCT/EP2021/072071, filed on Aug. 6, 2021, published under WO 2023/011736A1 on Feb. 9, 2023, designating the United States, which is hereby incorporated herein by reference in its entirety.

FIELD

An arrangement is indicated for a vehicle roof of a motor vehicle, in particular an arrangement for moving a movable roof for closing a roof opening of the vehicle roof.

Furthermore, a vehicle roof for a motor vehicle is indicated, in particular a vehicle roof which has an arrangement as described herein.

BACKGROUND

Arrangements with a movable cover for a vehicle roof may be configured as so-called spoiler roofs, as described for example in DE 10 2012 106 545 A1. Alternatively, it is also possible to configure the vehicle roof as a so-called externally guided sliding roof, as described for example in DE 197 13 347 C1.

It is desirable to indicate an arrangement for a vehicle roof which allows reliable operation. It is furthermore desirable to indicate a vehicle roof which allows reliable operation.

SUMMARY

According to at least one embodiment, an arrangement for a vehicle roof is indicated. The vehicle roof has a roof opening. The arrangement comprises:

- a cover which is displaceable in a longitudinal direction for closing the roof opening,
- a guide rail which is arranged on the vehicle roof,
- a deployment lever with a displacement slider which is pivotable relative to the guide rail, wherein the cover is coupled to the displacement slider and, for opening the roof opening, can be displaced in the longitudinal direction relative to the deployment lever and to the displacement slider,
- wherein the deployment lever has a first coupling to the guide rail and a second coupling to the guide rail, which are configured such that the deployment lever can be displaced relative to the guide rail in portions in the longitudinal direction,
- wherein the second coupling has a lever slotted track in the deployment lever and a sliding pin on the guide rail which is guided in the lever slotted track, and
- wherein the second coupling is arranged between the first coupling and the displacement slider in the longitudinal direction.

For example, the first coupling has a slotted track in the guide rail and a further sliding pin on the deployment lever, whereby the further sliding pin is guided in the slotted track. Other configurations of the first coupling are also possible.

The arrangement is designed in particular for a so-called spoiler roof. In spoiler roofs, at a rear edge in the opening direction, the deployment lever is first twisted or pivoted in order to raise a rear edge of the cover. The cover is displaced in the opening direction relative to the deployment lever in order to at least partially open a roof opening. The deployment lever is here stationary relative to the remainder of the vehicle roof and does not move in the opening direction with the cover. The further the cover is moved backward relative to the deployment lever, the greater the forces which must be resisted by the deployment lever. Vibrations of the cover also become greater when the vehicle is in motion. Reliable support of the cover even with a large opening width has been desired for some time and may be improved with the solution described herein.

In addition to spoiler roofs, for example so-called externally guided sliding roofs are known in which the deployment lever at the rear edge of the cover is displaced together with the cover in the opening direction relative to the remaining vehicle roof. There the above-described problem does not occur. Externally guided sliding roofs cannot however be used as substitutes for a spoiler roof since they are structurally completely different, and the use of a spoiler roof or an externally guided roof is dependent for example on the suitability of the base vehicle.

The deployment lever of the arrangement described herein is displaceable in portions in the longitudinal direction relative to the guide rail. Apart from this, the deployment lever can be locked relative to the guide rail in order not to move with the cover in the longitudinal direction relative to the guide rail during displacement of the cover. Starting from a closed position of the cover in which the cover closes the roof opening, the deployment lever is pivoted in order to raise the rear edge of the cover (so-called ventilation position). The arrangement described herein then allows displacement of the deployment lever in the opening direction along a predefined portion, before the deployment lever is locked relative to the guide rail and the cover is moved further in the opening direction relative to the deployment lever. This allows an improved support point of the cover on the deployment lever and on the guide rail. Greater natural frequencies of the arrangement, in particular of the open roof, can be achieved. Lower bearing forces on the end of the deployment lever nearest the guide rail can be achieved.

The first coupling to the slotted track in the guide rail and the further sliding pin on the deployment lever allows a longitudinal displacement, rotational movement and pivoting of the deployment lever relative to the guide rail. In the context of this disclosure, a pin may have various configurations, in particular various shapes. For example, a pin, in particular the further sliding pin, is cylindrical. A pin is for example elongate. For example, a pin has an oval cross-section. Other cross-sections are also possible, e.g. polygonal or semicircular. Other shapes which have a different geometric body as a base form are also possible. A pin, in particular the sliding pin, the further sliding pin and the other pins of this disclosure, may have any arbitrary form which allows displacement and holding in the respective associated guide, for example in a slotted track. The first coupling allows a connection between the deployment lever and the guide rail which is simply configured and hence can be produced cheaply. Also, it allows a comparatively long support factor on the deployment lever. The further sliding pin is in particular arranged at a front end of the deployment lever in the longitudinal direction.

According to further exemplary embodiments, the first coupling is configured such that the slotted track is formed in the deployment lever and the pin is arranged stationarily on the guide rail.

According to further exemplary embodiments, the second coupling is formed such that the lever slotted track is formed in the guide rail and the sliding pin is arranged stationarily on the deployment lever.

The second coupling is formed behind the further sliding pin in the longitudinal direction. The lever slotted track on the deployment lever and the sliding pin on the guide rail allow a longitudinal displacement, rotational movement and pivoting of the deployment lever. The second coupling allows a connection between the deployment lever and guide rail which is simply configured and hence can be produced cheaply. The second coupling usefully contributes to the stability of the arrangement with the long support factor.

The second coupling is formed behind the further sliding pin of the first coupling and in front of the displacement slider in the longitudinal direction. The lever slotted track of the second coupling is arranged on the deployment lever between the further sliding pin and the displacement slider in the longitudinal direction. The further sliding pin is arranged on the guide rail behind the slotted track of the first coupling in the longitudinal direction.

The cover is for example configured according to one of the embodiments described herein. According to further exemplary embodiments, the cover is configured differently and has for example a plurality of mounting tabs on each long side.

According to at least one embodiment, the arrangement has a drive carriage. The drive carriage is configured for pivoting the deployment lever. The drive carriage is guided movably in the longitudinal direction in the guide rail. The drive carriage is coupled to the deployment lever.

According to at least one embodiment, the deployment lever has a drive slotted track. The drive carriage has a drive pin. The drive pin is guided in the drive slotted track in order to transfer a displacement of the drive carriage into a movement of the deployment lever. A movement of the drive carriage is transmitted to the deployment lever by means of the engagement of the drive pin in the drive slotted track.

According to at least one embodiment, the drive carriage is pivotably coupled to the slide pin so that the deployment lever and the drive carriage are rigidly coupled together in the longitudinal direction. A movement of the drive carriage is transmitted to the deployment lever by means of the further sliding pin, which is attached both to the deployment lever and also to the drive carriage.

The drive carriage is for example driven directly or indirectly by an electric motor of the arrangement. The drive carriage is arranged in the region of the deployment lever, i.e. in particular assigned to a rear edge of the cover when the cover is in the closed position. The drive carriage is displaced in the longitudinal direction in order to pivot the deployment lever and displace this in the longitudinal direction. After the end of the pivot movement and displacement movement, for example the drive carriage is locked relative to the guide rail. To close the roof opening, the drive carriage is moved in the opposite direction so that the deployment lever is displaced forward and pivoted back to close the cover.

Locational or directional data, such as “behind” or “in front”, refer to the vehicle longitudinal direction. The vehicle longitudinal direction may also be described as the horizontal direction or X direction. Raising or deploying the cover substantially takes place in a vertical direction or Z direction or height direction. A “rear region of the cover” means for example the region closest to the back of the vehicle, starting from the middle of the cover.

According to at least one embodiment, the deployment lever has a support pin. The guide rail has a support slotted track. When the deployment lever is in a deployed position, the support pin is arranged in the support slotted track in order to support the deployment lever in the vertical direction. The support slotted track is oriented in particular substantially in the longitudinal direction. For example, the support slotted track is formed in a rear region of the guide rail. After pivoting of the deployment lever, for example the support pin is introduced into the support slotted track on displacement of the deployment lever in the longitudinal direction. The support slotted track may thus absorb forces in the Z direction. Thus the deployment lever is additionally supported on the guide rail by means of the support pin. This increases the stability of the entire arrangement and allows the displacement slider to be arranged comparatively far back.

According to at least one embodiment, the deployment lever has a first side region. The deployment lever has a second side region. The deployment lever has a connecting region. The connecting region connects together the first side region and the second side region. The first side region and the second side region are for example spaced apart from one another. The first side region and the second side region run for example in the vertical direction. The connecting region is oriented in the transverse direction and connects the two side regions. The guide rail is partially arranged between the first side region and the second side region. The deployment lever with the two side regions allows a variable arrangement of the elements of the first coupling and the second coupling. Also, additional elements such as e.g. the drive slotted track can thus be positioned variably on the deployment lever. This allows a comparatively compact arrangement.

For example, the lever slotted track is arranged in the first side region and the support region is arranged in the second side region. Alternatively or additionally, the displacement slider is arranged in the second side region. Alternatively or additionally, the drive slotted track is arranged in the second side region. Alternatively or additionally, the further sliding pin of the first coupling is arranged in the first side region.

According to at least one embodiment, the lever slotted guide has a course which, in the longitudinal direction towards the displacement slider, firstly runs straight and then rises. In the closed position, the sliding pin is arranged for example in the rising region. This on displacement of the deployment lever, initially the displacement slider is displaced in the Z direction with minimal movement in the longitudinal direction X, while the sliding pin is moved along the rising region. Then in the straight region, the coupling of the sliding pin in the lever slotted track causes a displacement of the deployment lever in the X direction without a great movement in the Z direction. In the opposite direction, on closing the cover starting from the ventilation position, the movement takes place in the reverse order.

According to at least one embodiment, the lever slotted track has a course which initially runs straight in the longitudinal direction towards the displacement slider, then rises and then runs straight again. In the closed position, the sliding pin is arranged for example in the rear straight region. Thus when the cover is in the closed position, a locking in the Z direction is achieved. On displacement of the deployment lever, after the sliding pin has left the rear straight region, firstly the displacement slider is moved in the Z direction while the sliding pin is moved along the rising region. Then in the straight portion, the coupling of the sliding pin in the lever slotted track causes a displacement of the deployment lever in the X direction without a great movement in the Z direction. In the opposite direction, on closing of the cover from the ventilation position, the movement takes place in the reverse order.

According to at least one embodiment, the deployment lever has a form which, in the state ready for operation, is always longer in the longitudinal direction than in a transverse direction and a vertical direction, each of which run transversely to the longitudinal direction. The deployment lever is significantly longer in the longitudinal direction than in the transverse direction and the vertical direction. This applies both to the arrangement in the open position and also to the arrangement in the ventilation position and in the closed position. This allows a favorable support factor for the cover in the ventilation position and in the open position. Irrespective of a degree of pivoting, the deployment lever is in particular always longer in the longitudinal direction than in the vertical direction.

According to at least one embodiment, in the longitudinal direction, the deployment lever has a protruding region which, when the cover is in the open position, protrudes over a fixed roof element in the longitudinal direction. The protruding region in particular protrudes to the rear. The protruding region protrudes to the rear in particular starting from the drive slotted track. In the closed position, the protruding region is arranged in front of the fixed roof element in the longitudinal direction. Displacement of the deployment lever in the longitudinal direction relative to the guide rail allows the protruding region to be arranged above the fixed roof element. The displacement slider is arranged at the rear end of the protruding region and can thus be arranged above the fixed roof element. This allows a high natural frequency, lower bearing forces on the deployment lever, and a longer support factor on the deployment lever. The lever force transmitted by the cover to the deployment lever is smaller, the further the protruding region of the deployment lever extends to the back, and the further back the displacement slider is arranged as a result.

According to at least one embodiment, the arrangement has a further drive carriage. The cover has a front edge. In the closed position of the cover, in the longitudinal direction, the front edge is furthest away from the deployment lever. The cover has a cover slotted track at a front edge. For example, the cover has a cover carrier and the cover slotted track is formed in the cover carrier. The further drive carriage engages in the cover slotted track in order to displace the cover in the longitudinal direction. The further drive carriage is for example connected directly to a drive cable, which in turn transmits a drive force of the electric motor to the further drive carriage.

In particular for part of the time, the drive carriage and the further drive carriage are connected together such that the movement of the further drive carriage is transmitted to the drive carriage. This allows for example the pivoting and displacement of the deployment lever.

The further drive carriage and the drive carriage can be decoupled from one another so that a movement of the further drive carriage is not transmitted to the drive carriage and hence to the deployment lever. The further drive carriage can thus be displaced relative to the drive carriage and the deployment lever, for example to move the cover between the ventilation position and the open position.

According to at least one embodiment, a vehicle roof for a motor vehicle has an arrangement according to at least one of the embodiments described herein. The vehicle roof comprises the movable cover. The cover and the roof opening are dimensioned such that, at least in the opening direction towards the back, the roof opening can be closed at a rear edge of the cover purely by means of the cover. The roof opening is for example an opening in the fixed roof of the motor vehicle which is made from sheet metal.

The roof opening has a size and the cover has a size which are matched to one another such that the roof opening can be closed by means of the movable cover, in that the rear edge of the cover is arranged directly adjoining the fixed roof. In the ventilation position and in the open position, the protruding region of the deployment lever is thus arranged above the fixed roof element of the vehicle roof, i.e. in particular above a sheet metal roof of the vehicle, and not above the roof opening.

According to a further embodiment, a vehicle roof has the arrangement described herein according to one of the described embodiments. The vehicle roof comprises the movable cover and a further cover. The movable cover and the further cover and the roof opening are for example dimensioned such that in the closed position, the cover and the further cover can together be arranged in the roof opening.

The movable cover and the further cover and the roof opening are for example dimensioned such that the roof opening can be closed by means of the cover and the further cover together. The further cover is in particular arranged in the roof opening immovably relative to the remainder of the vehicle roof in the state ready for operation. In the closed position, the movable cover is arranged in front of the further cover in the roof opening. The two covers together close the roof opening. In the open position, the movable cover is arranged above the further cover. The further cover thus still closes a part of the roof opening, in particular a rear part. In the open position, the protruding region of the deployment lever thus protrudes over the further cover. According to at least one embodiment, a cover is indicated for closing a roof opening of a vehicle roof. According to embodiments, the cover is a movable cover which can be displaced relative to a fixed roof of the vehicle by means of a deployment and displacement arrangement, in order to optionally at least partially open or close the roof opening. For example, the cover is used in a so-called spoiler roof and is part of an arrangement described herein for a vehicle roof. Alternatively, it is also possible to use the cover with other types of deployment and displacement mechanisms, for example in an externally guided sliding roof. It is also possible to use the cover as a fixed roof element which is fastened in the roof opening and in operation cannot be moved relative to the remainder of the vehicle roof.

The cover comprises:

a superficially extended panel, a cover reinforcement, wherein the cover reinforcement is fixed to the panel by means of a connection, and the cover reinforcement has a mounting tab, wherein the mounting tab is formed as one piece, has two mounting interfaces spaced apart from one another for coupling to the vehicle roof, and an elongate middle region between the mounting interfaces.

In contrast to conventional covers, the cover reinforcement of the cover described herein does not have a plurality of mutually independent mounting tabs, spaced apart from one another, for fastening of the cover carrier. Conventionally, multiple mounting tabs are provided on each long side of the cover. In contrast, the cover reinforcement of the cover described herein has a single mounting tab per long side. This mounting tab is elongate and extends over a majority of the long side. For example, the mounting tab extends in the longitudinal direction over at least half of the long side of the cover.

At least two mutually spaced mounting interfaces are formed on the one-piece mounting tab. The mounting interfaces, which are conventionally made of multiple mounting tabs with different spacings, are in the present cover reinforcement formed jointly on the one-piece mounting interface.

At the mounting interfaces, a connection can be created to the vehicle roof, for example an indirect connection by means of further mechanical elements, or a direct connection in which the mounting tab is attached directly to the vehicle bodywork e.g. by screws.

According to at least one embodiment, the connection comprises a plastic or is made of plastic. The plastic for example comprises a polyurethane or another, in particular foamable plastic. For production, the plastic is e.g. foam-molded in order to adhere to the cover reinforcement and the panel. For example, the connection comprises or is configured as a foam-molding. The foam may also be described as a surround foam-molding. The foam-molding adheres to the panel and partially surrounds the cover reinforcement in order to attach the cover reinforcement to the panel.

According to an exemplary embodiment, the cover reinforcement comprises a sheet metal. The cover reinforcement is in particular formed from a sheet metal, in particular by means of various production and forming processes. For example, the cover reinforcement is a deep-drawn part. In particular, the cover reinforcement comprises a deep-drawn sheet metal. The cover is formed from the sheet metal by bending on each of the two long sides of the sheet metal.

For example, the mounting tab has a length of more than 10 cm and less than 60 cm. It is also possible that the mounting tab has a length greater than 60 cm. It is also possible that the mounting tab has a length greater than 30 cm. The length of the mounting tab is predefined such that it extends over a majority of the long side of the cover, and the two mounting interfaces are spaced sufficiently far apart from one another to allow a reliable and stable fastening of the cover to the vehicle roof.

According to at least one embodiment, a cover arrangement for a vehicle roof comprises a cover described herein. The cover arrangement comprises a cover carrier. The cover carrier is configured for coupling to the mounting interfaces and for coupling to the vehicle roof. The cover carrier is fastened to the mounting interfaces of the mounting tab. For example, the cover arrangement comprises two cover carriers. Each of the two cover carriers is assigned to one of the two long sides of the cover. Precisely one cover carrier is connected for example to precisely one mounting tab in each case.

According to at least one embodiment, a vehicle roof with a roof opening comprises a cover arrangement described herein. The vehicle roof has a movement mechanism for moving the cover relative to the roof opening. The movement mechanism for example has an arrangement described herein for the vehicle roof with a deployment lever.

The cover carrier is coupled to the movement mechanism, for example to the deployment lever and guide rail, in order to couple the cover to the vehicle roof.

The cover carrier is for example coupled to the deployment lever such that a relative displacement between the cover carrier and the deployment lever is possible, in order to move the cover into an open position.

It is also possible that the cover carrier and the rear deployment lever are connected by means of a rotary joint, wherein the rotary joint does not allow a displacement of the cover carrier relative to the deployment lever. In order to displace the cover relative to the vehicle roof into the open position, the rear deployment lever travels together with the cover relative to the remaining vehicle roof.

In particular when the cover described herein, or the cover arrangement described herein, is used together with the arrangement described herein for the vehicle roof, a stable vehicle roof is achieved which allows a reliable operation while requiring comparatively little installation space.

Further advantages, features and refinements arise from the following examples explained in conjunction with the figures. The same or similar elements, or those with the same effect, may carry the same reference signs across the figures.

BRIEF DESCRIPTIONS OF THE DRAWINGS

Figure 9:
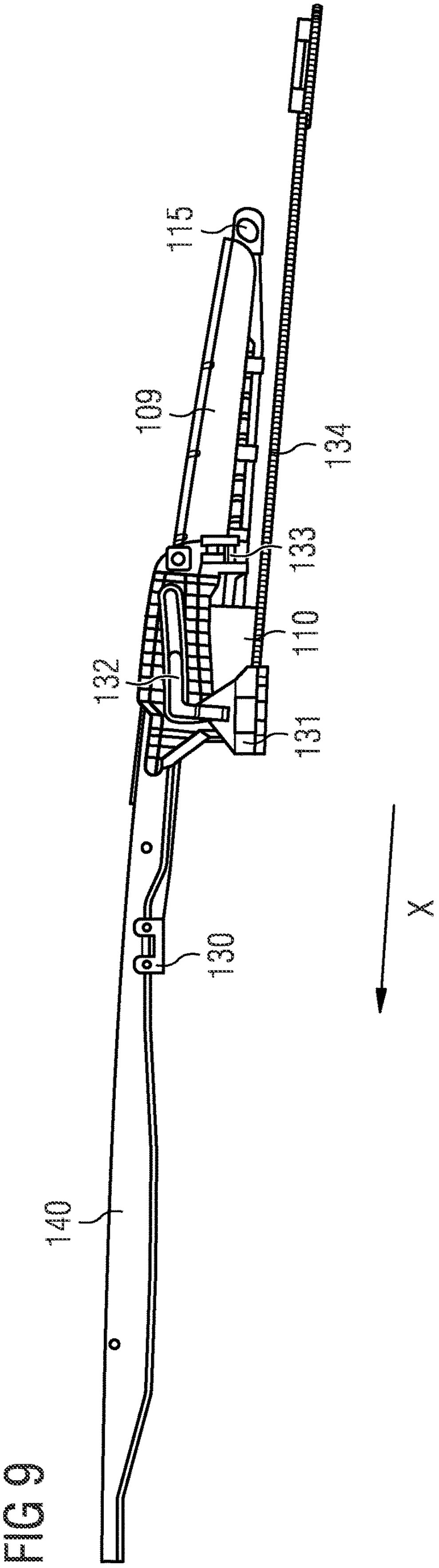
Figure 10:
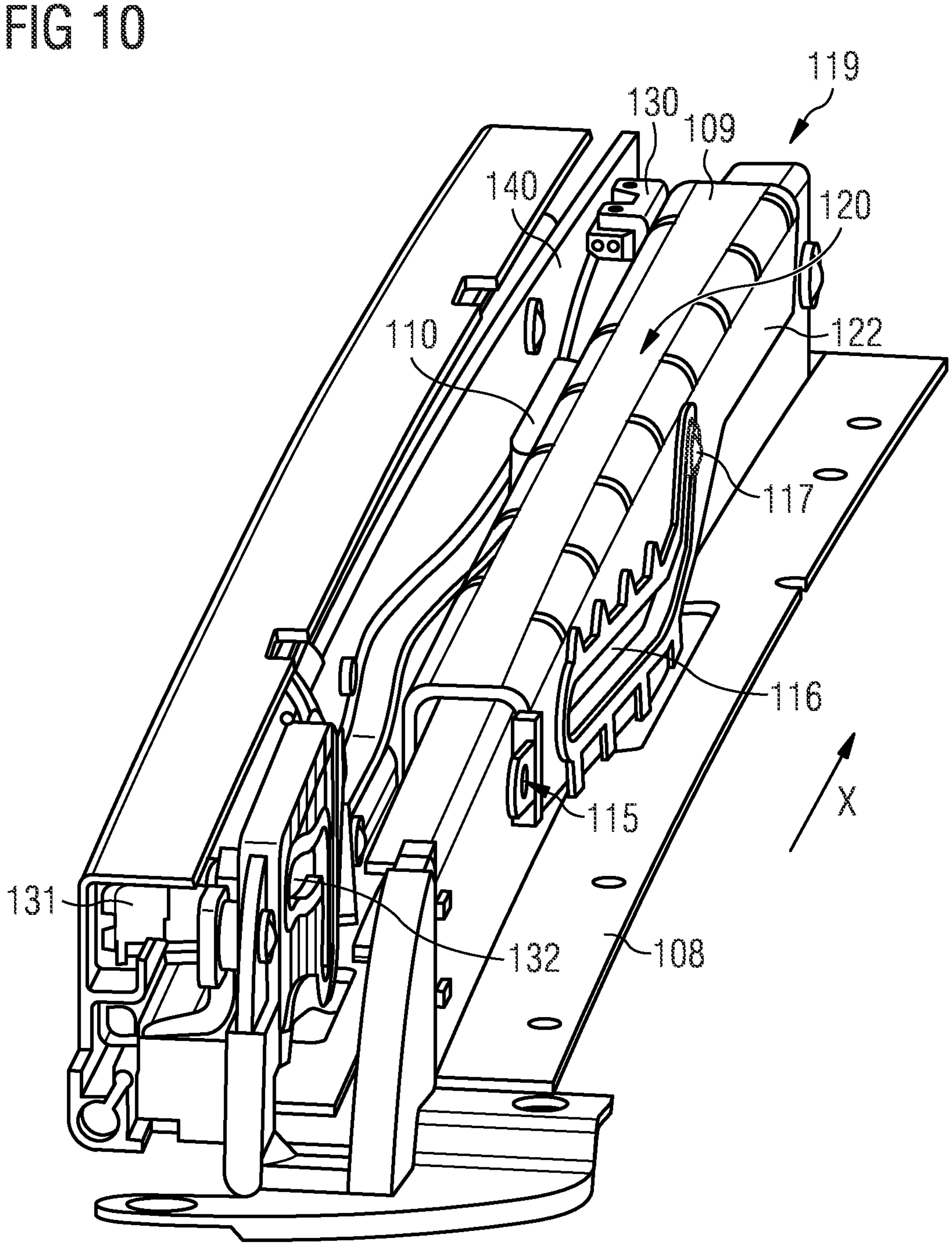
Figure 11:
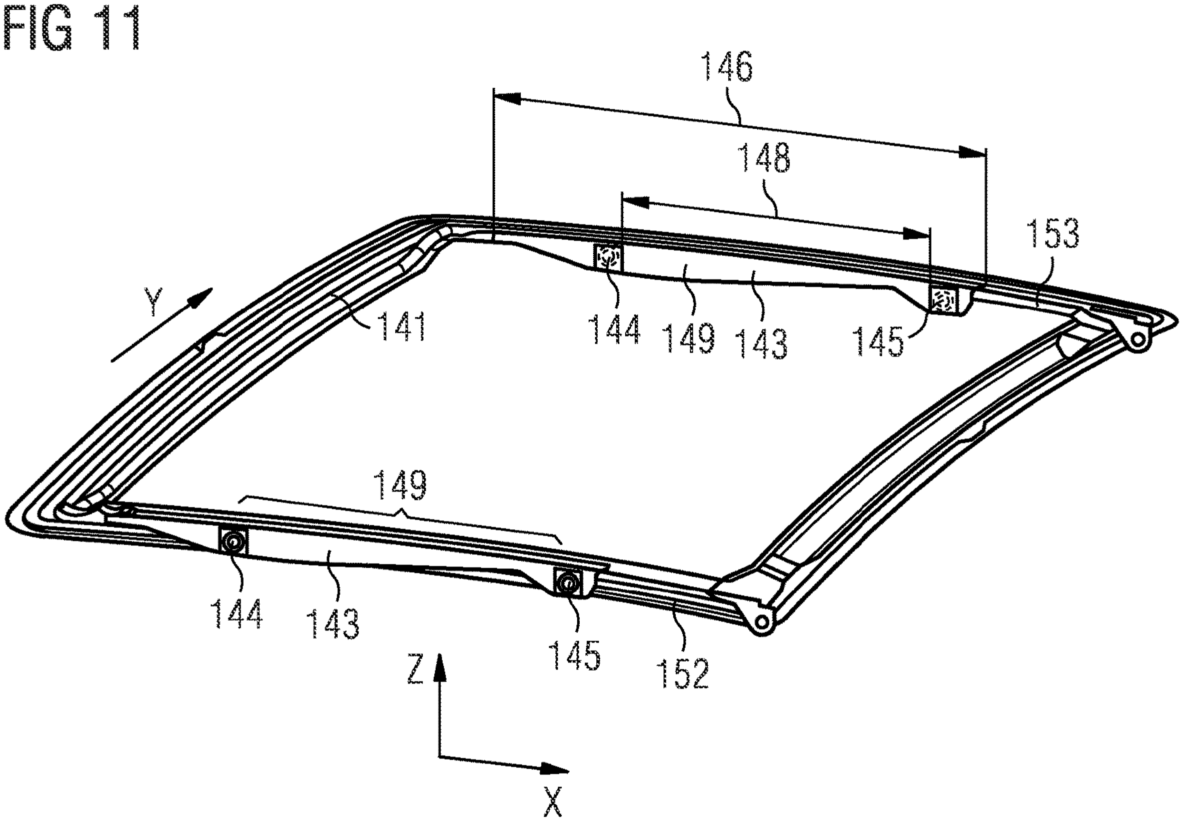
Figure 12:
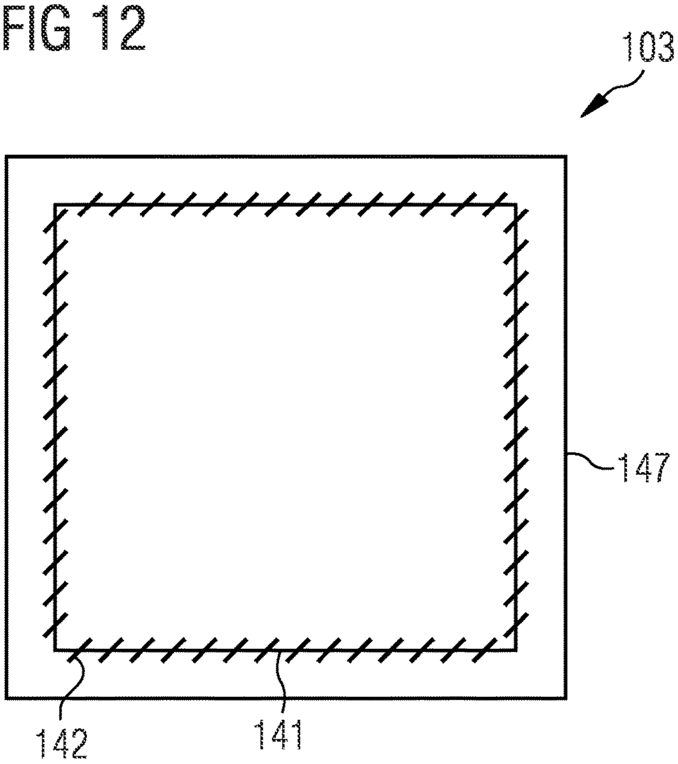
Figure 13:
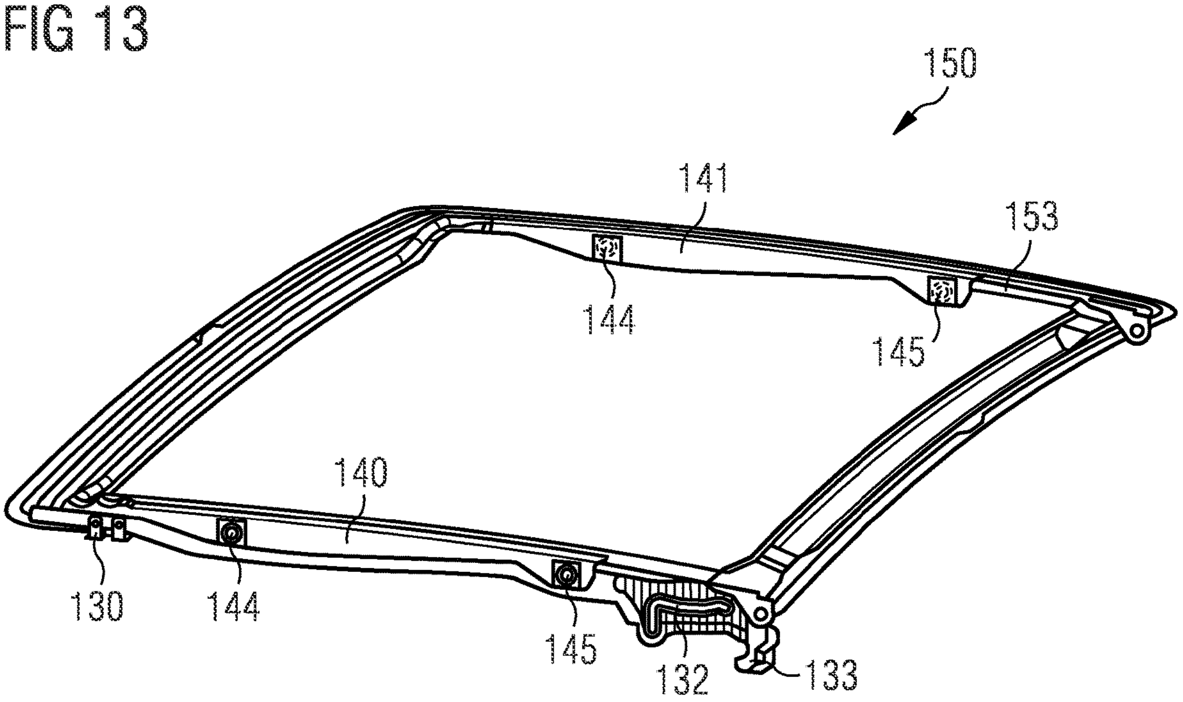
Figure 14:
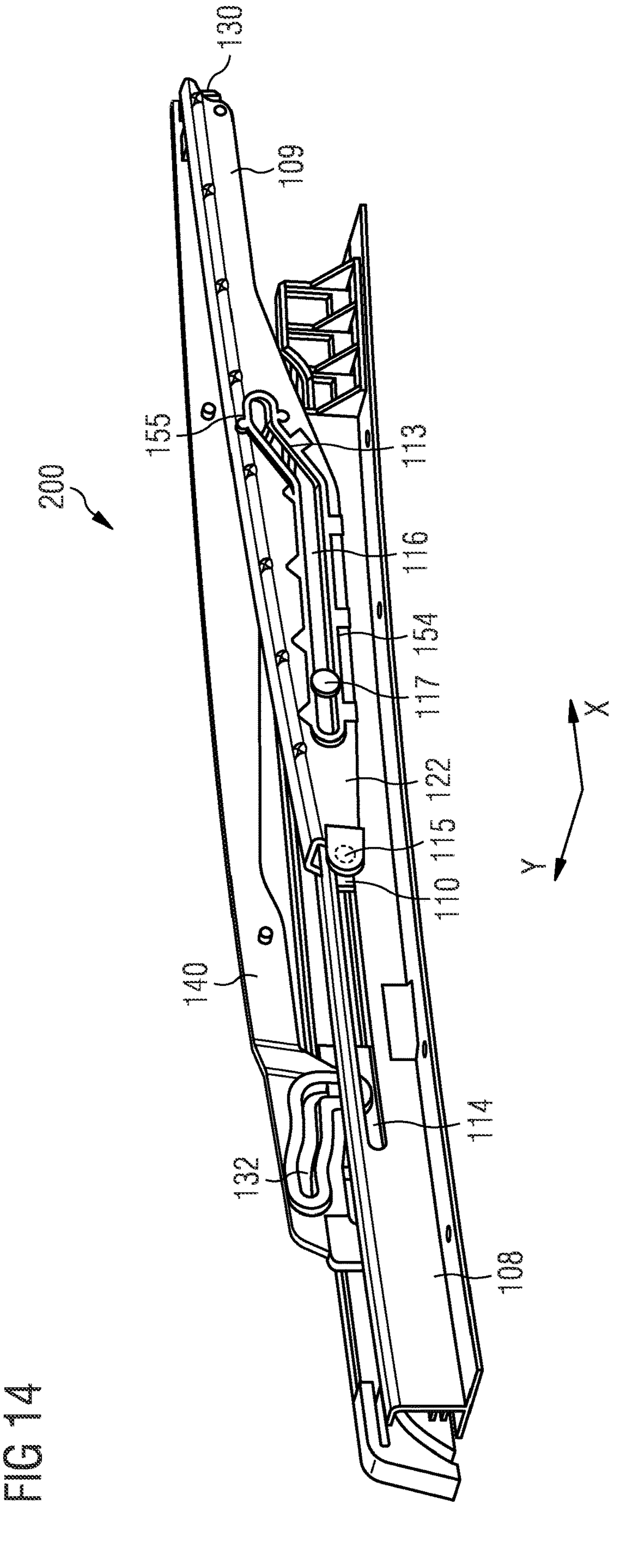
Figure 15:
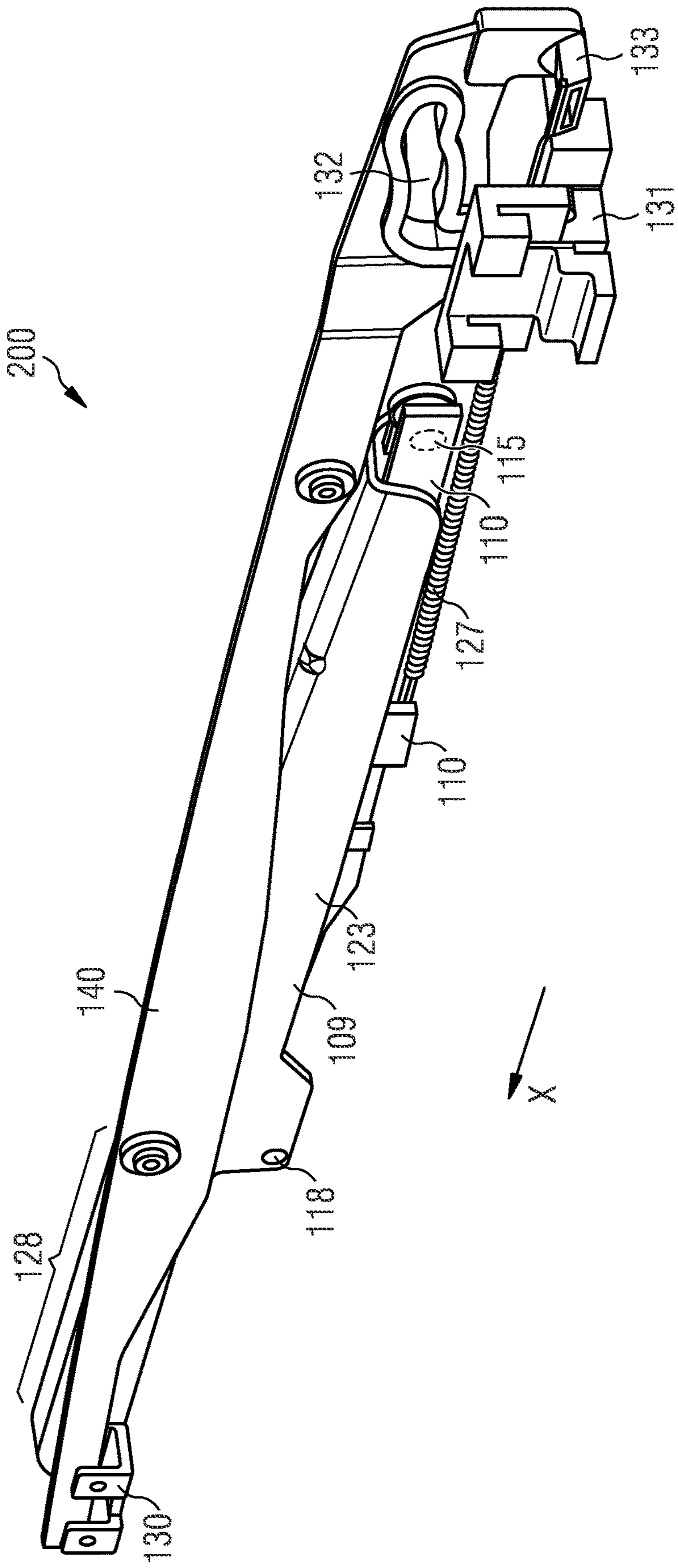
Figure 16:
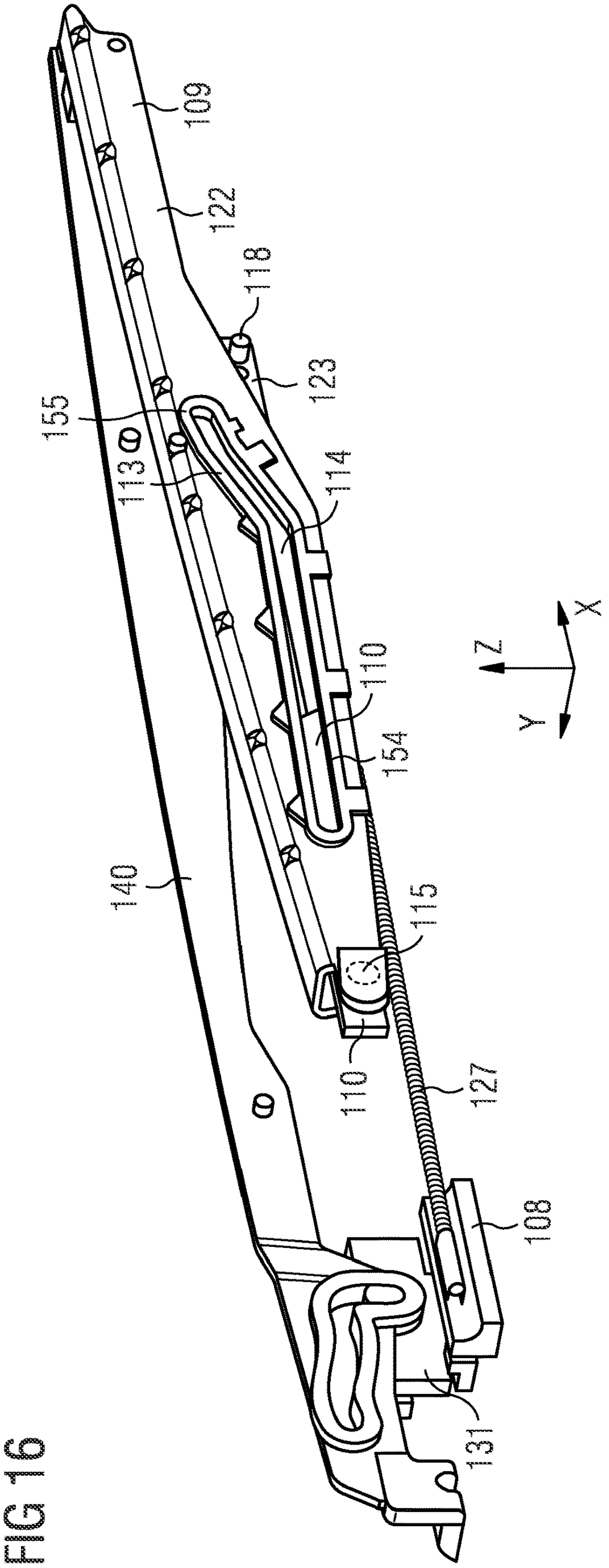

In the drawings:

FIG. 1 shows a schematic illustration of a vehicle according to an exemplary embodiment, FIGS. 2 to 10 show schematic illustrations of the arrangement or parts of the arrangement according to an exemplary embodiment, in various positions, FIG. 11 shows a schematic illustration of a cover reinforcement for a cover according to an exemplary embodiment, FIG. 12 shows a schematic illustration of a cover according to an exemplary embodiment, FIG. 13 shows a schematic illustration of a cover arrangement according to an exemplary embodiment, and FIGS. 14 to 16 show respective schematic illustrations of the arrangement or parts of the arrangement according to a further exemplary embodiment.

DETAILED DESCRIPTION

FIG. 1 shows a schematic illustration of a vehicle roof 101 of a vehicle 100. The vehicle roof 101 is in particular part of a motor vehicle 100, for example part of a car. The vehicle roof 101 has an arrangement 200. The arrangement 200 has a cover 103. The cover 103 serves for closing a roof opening 102. The roof opening 102 can be closed and at least partially opened by displacement of the cover 103 in a longitudinal direction X. For this, the cover 103 is movable in the X direction relative to a fixed roof element 129 of the vehicle roof 101.

FIG. 1 shows the cover 103 in its closed position in which the cover 103 closes the roof opening 102. Starting from the closed position, the cover 103 can be raised in the vertical direction Z and displaced in the longitudinal direction X in order to at least partially open the roof opening 102.

The opening 200 is configured in particular in the manner of a spoiler roof. As illustrated schematically for example in FIGS. 2 to 10, the arrangement 200 has a deployment lever 109, which may also be described as a rear deployment lever 109. The deployment lever 109 serves for raising and lowering a rear edge 107 of the cover 103. The rear edge 107 is arranged opposite a front edge 106 of the cover 103 in the longitudinal direction X. The front edge 106 of the cover is nearest to a windscreen 104 of the vehicle 100.

Figure 2:
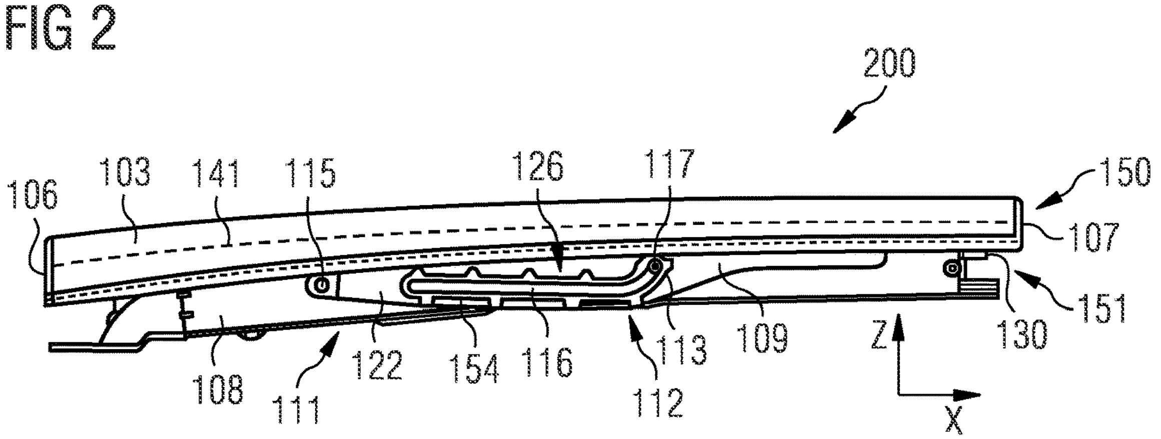

The deployment lever 109 is supported on a guide rail 108. The guide rail 108 is arranged in the longitudinal direction X and is connected to a bodywork 105 of the vehicle 100 next to the roof opening 102 in the transverse direction Y. A guide rail 108 with associated deployment mechanism, which may also be described as a movement mechanism 151, is arranged on both sides of the roof opening 102 (FIG. 2). The deployment mechanism 151 or the arrangement 200 is the same on both sides and configured accordingly. Only one side will be described below, and the description also applies accordingly to the other side of the roof opening 102.

The deployment lever has a displacement slider 130 at a rear end in the X direction. The displacement slider 130 is rotatable relative to the deployment lever 109. The displacement slider 130 is coupled to the cover 103, in particular to a cover carrier 140 of the cover 103. The cover carrier is for example screwed to a cover reinforcement 141 (FIG. 11) of the cover 103.

The cover 103 or the cover carrier 104 is held in the displacement slider 130 such that the cover 103 can move in the X direction relative to the displacement slider 130. Also, raising and lowering of the cover 103, in particular a rear region of the cover at the rear edge 107, in the vertical direction Z is possible with the deployment lever 109 and the displacement slider 130.

The deployment lever 109 has a lever slotted track 116. The lever slotted track is arranged in front of the displacement slider 130 in the X direction. A protruding region 128 of the deployment lever 109 is formed between the displacement slider 130 and the lever slotted track 116 in the X direction. A sliding pin 115 is formed on the deployment lever 109 in front of the lever slotted track 116 in the X direction. The sliding pin 115 protrudes beyond the deployment lever in the transverse direction Y. In the longitudinal direction X, the sliding pin 115 is thus formed at a front end of the deployment lever 109. The lever slotted track 116 is formed behind this. The displacement slider 130 is arranged on the following protruding region 128 at the rear end of the deployment lever 109.

The sliding pin 115 engages in a slotted track 114. The slotted track 114 is formed in the guide rail 108. The slotted track 114 and the sliding pin 115 together form a first coupling 111 between the deployment lever 109 and the guide rail 108. The first coupling 111 is nearer to the front edge 106 of the cover than a second coupling 112 between the deployment lever 109 and the guide rail 108.

The guide rail 108 has a further sliding pin 117. The further sliding pin 117 is guided in the lever slotted guide 116. The lever slotted guide 116 and the further sliding pin 117 together form the second coupling 112. The second coupling 112 is formed between the sliding pin 115 and the displacement slider 130.

The lever slotted track 116 has a course 126. From front to back in the longitudinal direction X, the lever slotted track 116 firstly has a straight course 154. At the rear end of the lever slotted track 116, the course 126 has a rising region 113. The rising region 113 runs substantially in the vertical direction Z, in particular when the deployment lever 109 is deployed. The straight region 154 runs substantially in the longitudinal direction X, in particular when the deployment lever 109 is deployed. In the closed position (FIGS. 2, 5, 10), the further sliding pin 117 is arranged in the rising region 113.

Figure 3:
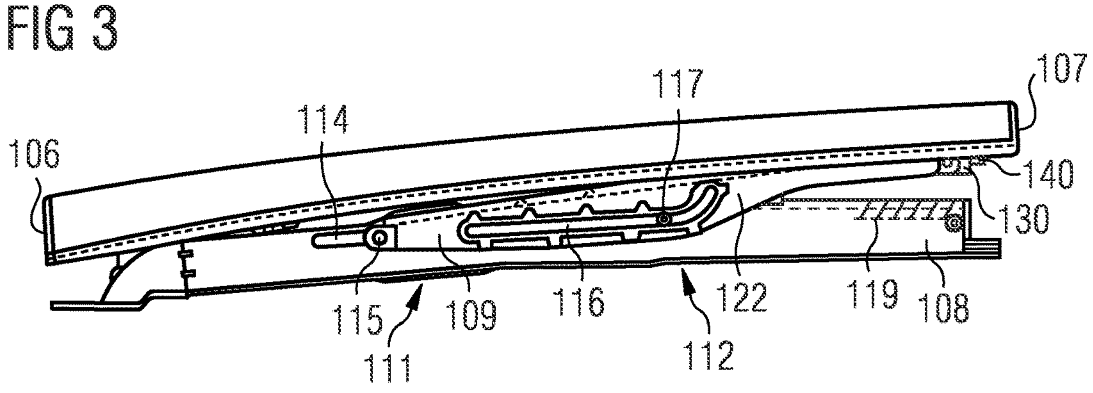
Figure 4:
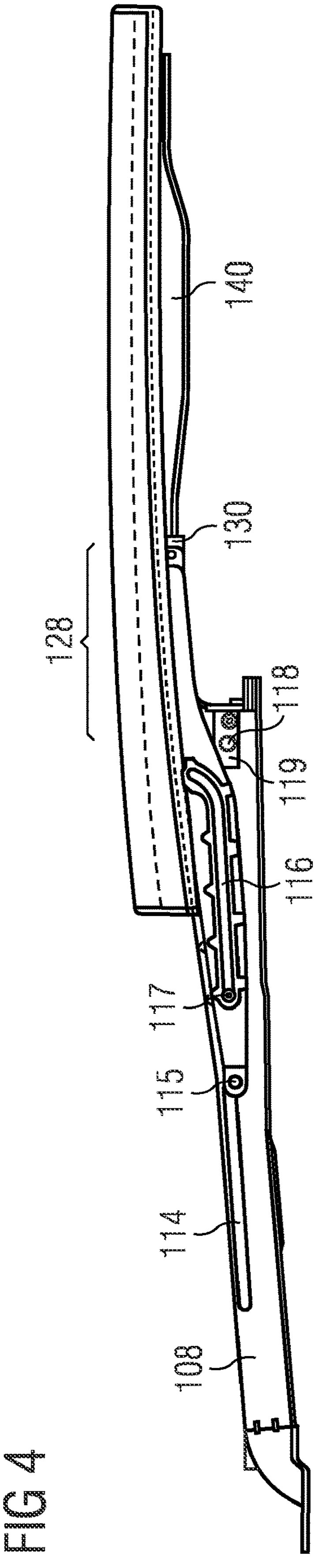
Figure 6:
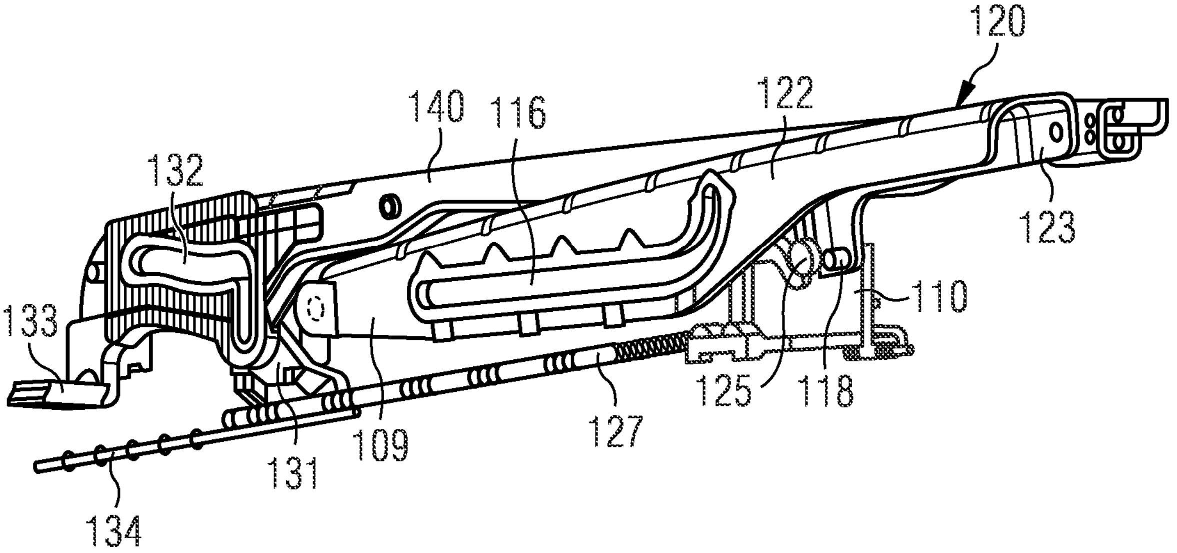

Starting from the closed position, the deployment lever 109 and cover 103 can firstly be pivoted into the ventilation position (FIGS. 3, 6). Then the cover 103 can be displaced relative to the deployment lever 109 into the open position (FIGS. 4, 7, 9).

Figure 5:
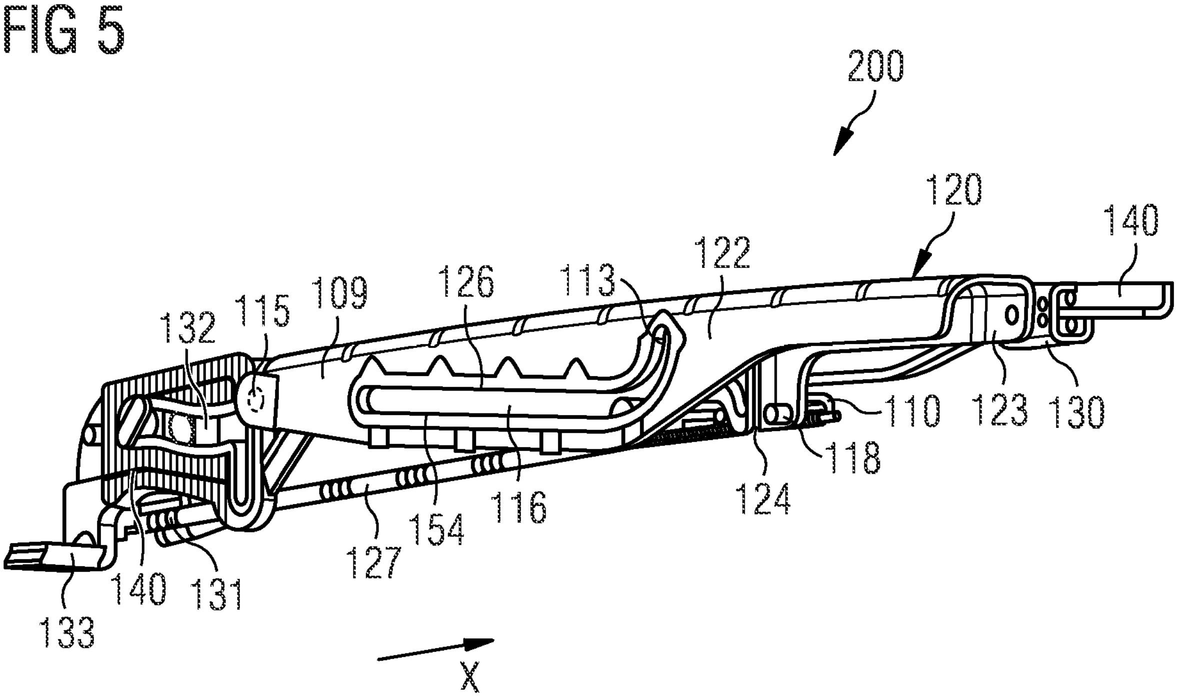
Figure 7:
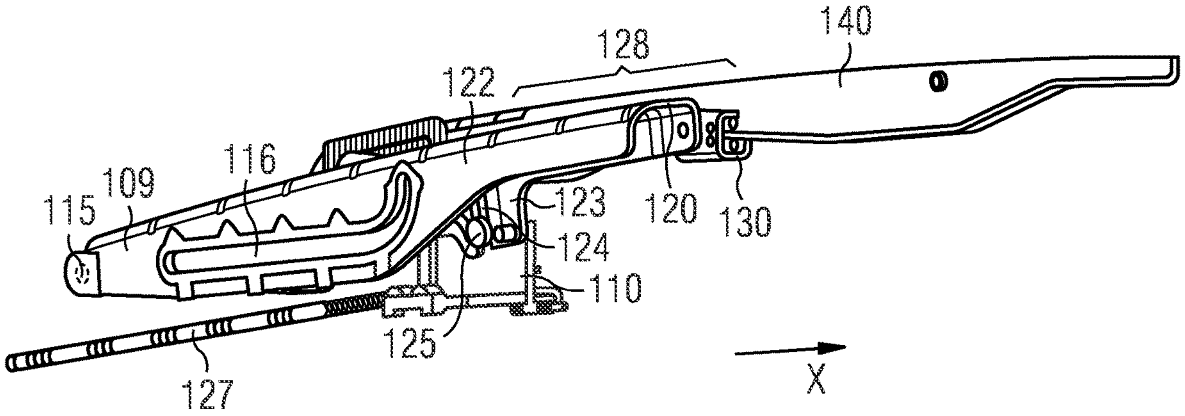

For pivoting and displacement of the deployment lever 109, the arrangement 200 has a drive carriage 110, which is illustrated explicitly for example in FIGS. 5 to 7. The drive carriage 110 serves for moving the deployment lever 109. The drive carriage 110 is driven for example by means of a coupling to a further drive carriage 131 (FIGS. 5, 6). The further drive carriage 131 is connected to an electric motor by means of a drive cable 134, for example a threaded cable with good compressive and tensile strength. In operation, the drive cable 134 displaces the further drive carriage 131 in the longitudinal direction X. This displacement, starting at the closed position of the cover 103, is transmitted to the drive carriage 110 by means of a locking element 127 (FIGS. 5, 6, 7). The drive carriage 110 is thus also displaced towards the back in the longitudinal direction X. The drive carriage 114 is guided in the guide rail 108.

Figure 8:
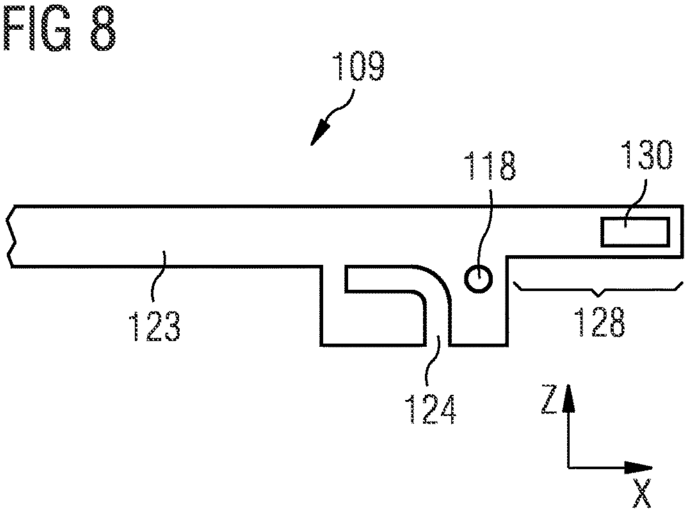

In the exemplary embodiment of FIGS. 2 to 10, the drive carriage 110 has a drive slotted track 124. The drive slotted track 124, in the longitudinal direction X, firstly has a straight course and then a region running substantially in the vertical direction Z (FIG. 8).

In the exemplary embodiment of FIGS. 2 to 10, the drive carriage 110 has a drive pin 125. The drive pin 125 engages in the drive slotted track 124. When the drive pin 125 is arranged in a straight region of the drive slotted track 124, the drive carriage 110 can be moved in the longitudinal direction X relative to the deployment lever 109. In the vertical direction Z, the deployment lever 109 is secured and locked against accidental movement by means of the engagement of the drive pin in the straight region of the drive slotted guide 124.

As soon as the drive pin 125 is arranged in the vertical region of the drive slotted guide 124, a displacement of the drive carriage 110 in the longitudinal direction X is transferred into a movement of the deployment lever 109 in the longitudinal direction X. The drive carriage 110 can thus move the deployment lever 109 in the longitudinal direction X relative to the guide rail 18.

The displacement of the deployment lever 109 relative to the guide rail 108 leads to a pivoting of the deployment lever 109 because of the second coupling 112 and the course 126 of the lever slotted guide 116. A rotational axis of this pivoting is arranged in particular in the sliding pin 115.

Because of the straight region of both the lever slotted track 116 and the slotted track 114 in the guide rail 108, the pivoted deployment lever 109 can be displaced relative to the guide rail in the longitudinal direction X. Thus starting from the ventilation position, the displacement slider 130 can be moved further back over the fixed roof element 129.

In order to support the deployment lever reliably on the guide rail 108 in the vertical direction Z during this movement and in the open position, a support pin 118 is formed on the deployment lever 109 (FIGS. 5, 6, 7, 8). The support pin protrudes in the transverse direction Y and is configured to cooperate with a support slotted track 119 (FIGS. 3, 4, 10). The support slotted track 119 is formed in a rear region of the guide rail 108.

After deployment of the deployment lever 109 into the ventilation position, the support pin 118 is arranged in the same plane in the vertical direction Z as the support slotted track 119. On movement of the deployment lever 109 in the X direction, the support pin 118 enters the support slotted track 119. The support slotted track 119 is formed straight in the X direction. The support pin 118 can thus rest on the walls of the support slotted track 119, in particular towards the bottom and the top in the vertical direction Z. Thus forces, in particular forces in the vertical direction Z, can be transferred from the deployment lever 109 to the guide rail 108. Thus the deployment lever 109 is additionally supported by the support pin 118, in particular in the open position.

The deployment lever 109 has a first side region 122. The first side region 122 is oriented in an XZ plane. The deployment lever 109 has a second side region 123. The second side region 123 is also oriented in a ZX plane. In the transverse direction Y, the first side region 122 and the second side region 123 are spaced apart from one another. In the transverse direction Y, the deployment lever 109 has a connecting region 120. The connecting region is arranged in an XY plane. The connecting region 120 connects the two side regions 122, 123.

Parts of the guide rail 108 may be arranged between the two side regions 122, 123. In particular, the side region 122 is arranged on a side of the guide rail 108, and the second side region 123 is arranged on an opposite side of the guide rail 108, or in a middle region of the guide rail 108.

For example, the sliding pin 115 and the lever slotted track 116 are formed in the first side region 122 of the deployment lever 109. For example, the drive slotted track 124, the support pin 118 and the displacement slider 130 are arranged in the second side region 123 of the deployment lever 109. Thus it is possible for different elements of the couplings 111, 112 and the further elements for drive, movement and coupling to be arranged in different regions of the deployment lever 109 and in different side regions of the guide rail 108. This allows an efficient use of installation space.

A cover slotted track 132 is formed on the cover 103, in particular on the cover carrier 140, in order to raise and lower the front edge 106 of the cover 103 in the vertical direction Z. The further drive carriage 131 engages in the cover slotted track 132. The further drive carriage 131 is thus movable in portions relative to the cover 103 and the cover carrier 140. When the further drive carriage 131 is arranged at the end of the cover slotted track 132, a movement of the further drive carriage 131 in the X direction is transferred to the cover carrier 140 and the cover 103.

At its front end nearest the windscreen 104, the cover carrier 140 has a cover slider 133. The cover slider 133 is attached to the cover carrier 140 and for example is not pivotable or displaceable relative to the cover carrier 140. It is also possible that the cover slider 133 is rotatable relative to the cover carrier 140 about a rotational axis running in the transverse direction Y. In the longitudinal direction X and/or the vertical direction Z, the cover slider 133 in this exemplary embodiment is however immovable relative to the cover carrier 140. The cover slider 133 is guided in the guide rail 108 and serves for raising and displacing the front edge of the cover.

The protruding region 128 is formed on the rear side of the deployment lever 109. The protruding region 128 extends in particular backward in the longitudinal direction X, starting from the drive slotted track 124, as far as the displacement slider 130. When the cover 103 is in the ventilation position, this protruding region 128 is for example still arranged in front of the fixed roof element 129.

Starting from the ventilation position up to the open position of the cover 103, the deployment lever is displaced relative to the guide rail 108 in the X direction so that the protruding region 128 is arranged above the fixed roof element 129 in the vertical direction Z. The protruding region 128 of the deployment lever 109 protrudes backward over the fixed roof element 129. The deployment lever 109 extends linearly forwards in the X direction and rests on the sliding pin 115 and on the further sliding pin 117 comparatively far forward, and is also held by the support pin 118.

By means of the locking element 127, the drive carriage 110 is decoupled from the further drive carriage 131 and locked relative to the guide rail 108 in the X direction. For example, at its end remote from the deployment lever 109, the locking element engages in a corresponding lock slotted track of the guide rail 108.

In order to open the cover 103 further, the cover 103 is then moved back relative to the deployment lever 109 in the X direction. Thus in the open position, the cover 103 can be arranged above the first roof element 129 in the vertical direction Z.

When the cover 103 is in the fully open position, the sliding pin 115 of the deployment lever 109 is arranged for example in front of the further drive carriage 131 in the longitudinal direction X. In the fully open position, the cover slotted track 132 is arranged behind the sliding pin 115 in the longitudinal direction X. The deployment lever 109 thus extends forward in front of the front edge 108 of the cover 103 in the longitudinal direction X when the cover 103 is in the fully open position. The front edge 106 of the cover 103 is arranged between the sliding pin 115 and the displacement slider 130 in the longitudinal direction X when the cover 103 is in the fully open position.

When the cover is in the fully open position, the further drive carriage 131 is arranged between the sliding pin 115 and the displacement slider 130 in the longitudinal direction X. When the cover 103 is in the fully open position, the further drive carriage 131 is arranged next to the deployment lever 109 in the transverse direction Y. When the cover 103 is in the open position, the deployment lever 109 is pivoted relative to the cover 103, in comparison with the closed position of the cover 103. The pivoting of the deployment lever 109 leads to a raising of the rear edge 107 relative to the fixed roof element 129.

The deployment lever 109 which, in any position of the cover 103, is always longer in the longitudinal direction X than in the vertical direction Z or in the transverse direction Y, allows the cover carrier 140 to be supported comparatively far back, and in particular above the fixed roof element 129. In the closed position of the cover 103 and in the ventilation position, the deployment lever 109 extends along a longitudinal extent 121 of the cover 103. The longitudinal extent 121 of the cover extends between the front edge 106 and the rear edge 107 in the longitudinal direction X. When the cover 103 is closed and when the cover 103 is arranged in the ventilation position, the deployment lever 109 extends forward in the longitudinal direction X, in the direction of the windscreen 104, e.g. along a fifth, a quarter, a third or more, for example up to half or up to two-thirds of the longitudinal extent 121 of the cover 103.

Supporting the cover carrier 140 as far back as possible in the longitudinal direction X reduces lever forces which act via the cover carrier 140 on the sliding pin 115 and the further sliding pin 117. In particular, when the cover 13 is opened, the displacement slider 130 is arranged above the fixed roof element 129. Supporting the front end of the deployment lever 109 via the sliding pin 115 as far forward as possible in the X direction also leads to favorable lever forces, which allow a reliable support of the deployment lever 109 even when the cover 103 is moved far to the back. The support by means of the support pin 118 further stabilizes the arrangement. Thus as a whole, a large opening size of the roof opening 107 can be achieved, since the cover 103 can be moved relatively far to the back but still be reliably supported and held by means of the deployment lever 109.

The fixed roof element 129 is for example a further cover which is arranged in the roof opening 102. It is also possible that the fixed roof element 129 is part of the vehicle bodywork 105 or a panel which forms the vehicle roof 101 and surrounds the roof opening. The arrangement 200 is constructed such that the elements of the arrangement 200 and further mechanism elements need not pass under the fixed roof element 129 in order to fully open the cover 103. In particular, the further drive carriage 131 travels only as far as the front of the fixed roof element 129.

The arrangement 200 has a good support factor and hence a high natural stiffness. In the Z direction, while taking up comparatively little space, a stable support of the deployment lever 109 is achieved, in particular by means of the support pin 118. Control of the deployment lever 109 by means of the second coupling 112, close to the rotational point of the deployment lever 109 on the sliding pin 115, allows a large lift in the Z direction at the rear end with a small rotational angle. For this, in particular, no additional deployment lever or coupling lever is required.

FIG. 11 shows the cover reinforcement 141 which can be used particularly beneficially in the arrangement 200. According to further exemplary embodiments, the cover reinforcement 141 can however also be used beneficially with other arrangements. The cover reinforcement 141 can also be used for example on externally guided sliding roofs or any other type of cover 103, for example with the fixed roof element 129.

The cover reinforcement 141 is in particular a deep-drawn part made for example from sheet metal. In the exemplary embodiment illustrated, the cover reinforcement 141 is arranged as a frame. It is also possible that the cover reinforcement 141 is formed only in part regions, for example only along the two sides of the cover 103 between the front edge 106 and the rear edge 107 in the longitudinal direction X.

The cover reinforcement 141 has a mounting tab 143 on both long sides 152, 153 running in the X direction. The two mounting tabs 143 are similar and formed corresponding to one another. Only one mounting tab 143 is described below. The other mounting tab 143 is configured accordingly.

The mounting tab 143 is elongate in the longitudinal direction X and has two mounting interfaces 144, 145 spaced apart from one another. The cover carrier 140 can be mounted at the mounting interfaces 144, 145 (FIG. 13) to form a cover arrangement 150. For example, the cover carrier 140 is attached to the mounting interfaces 144, 145 by screws.

The mounting interfaces 144, 145 are arranged at a distance 148 from one another. The distance 148 amounts for example to 10 cm or more, for example the distance 148 has a value in a range from 20 cm to 50 cm, or 20 cm to 40 cm.

The mounting tab 143 is formed as one piece between the two mounting interfaces 144, 145. The mounting tab 143 has a middle region 149 which is formed between the mounting interfaces 144, 145. The middle region 149 of the mounting tab 143 comprises the material of the cover reinforcement 141.

During production, the mounting tab 143 is bent over its entire length out of the cover reinforcement 141 as one piece, so that the mounting tab 143 is oriented in the vertical direction Z. The mounting tab 143 thus extends in an XZ plane.

The two mounting interfaces 144, 145 are not formed a separate elements but are part of a single common mounting tab 143. The mounting tab 143 is formed as one piece over its entire length 146 and formed from the material of the cover reinforcement 141.

The two mounting interfaces 144, 145 are connected together by means of the middle region 149 of the mounting tab 143. The middle region 149 is configured in particular to transmit forces between the two mounting interfaces 144, 145.

The mounting tab 143 extending as one piece over the entire length 146 allows a large geometric moment of inertia between the two mounting interfaces 144, 145. The shaping of the sheet metal of the cover reinforcement 141 is continuous between the mounting interface 144 and the mounting interface 145. Thus the stiffness of the cover reinforcement 141 and hence the cover 103 is increased. For example, a natural frequency of around 1 Hz is increased in comparison with conventional cover reinforcements with a plurality of mounting tabs on each long side.

FIG. 12 shows the cover 103 with the cover reinforcement 141. The cover reinforcement 141 is attached to a panel 147 of the cover 103 by means of a connection 142. The panel 147 is for example a superficially extended glass panel or a superficially extended plastic panel, or a panel of another material. The cover reinforcement 141 is attached, in particular foam-molded, to a side of the panel 147 facing an interior of the vehicle 100 during operation. The connection 142 comprises for example a plastic which adheres to the panel 147 and attaches the cover reinforcement 141. For example, the connection 142 comprises a PU foam or another plastic foam.

FIG. 13 shows the cover arrangement 150 which comprises the cover reinforcement 141 and a cover carrier 140. In the state ready for operation, a cover carrier 140 is also attached to the cover reinforcement 141 at the second long side 135 by means of the mounting interfaces 144, 145.

FIGS. 14 to 16 show schematic illustrations of the arrangement 200 according to a further exemplary embodiment. The arrangement 200 according to the exemplary embodiment in FIGS. 14 to 16 substantially corresponds to the exemplary embodiment in FIGS. 2 to 10. In contrast to the exemplary embodiment in FIGS. 2 to 10, the arrangement 200 in the exemplary embodiment of FIGS. 14 to 16 has a different coupling between the deployment lever 109 and the drive carriage 110. Also, the lever slotted track 116 has a different course 126. A drive slotted track 124 and a drive pin 125 are not present in the exemplary embodiment of FIGS. 14 to 16. Otherwise, the embodiments of for example the deployment lever 109, the further drive carriage 131, the locking element 127 and the cover carrier 140, correspond to those described above.

In the exemplary embodiment of FIGS. 14 to 16, the drive carriage 110 and the deployment lever 109 are connected together such that no displacement is possible between the drive carriage 110 and the deployment lever 109. A displacement of the drive carriage 110 relative to the guide rail 108 always leads to a corresponding displacement of the deployment lever 109 relative to the guide rail 108.

The drive carriage 110 and the deployment lever 109 are coupled together by means of the sliding pin 115. The sliding pin 115 extends in the slotted track 114 through the guide rail 108 in the transverse direction Y. In the transverse direction Y, the deployment lever 109, in particular the side region 122 of the deployment lever 109, is arranged on one side of the sliding pin 115. On the opposite side of the sliding pin 115 in the transverse direction Y, the sliding pin 115 is attached to the drive carriage 110. The drive carriage is arranged for example between the two side regions 122, 123 in the transverse direction Y. The drive carriage is arranged for example below the connecting region 120 in the vertical direction Z.

The sliding pin 115 is rigidly and immovably coupled to the drive carriage 110 in the longitudinal direction X. A movement of the drive carriage 110 is transmitted to the deployment lever 109 by means of the sliding pin 115. Accordingly, a locking of the drive carriage 110 relative to the guide rail 108 is transferred to the deployment lever 109 by means of the sliding pin 115. A pivoting of the deployment lever 109 relative to the drive carriage 110 about a rotational axis is possible. The rotational axis is oriented in the transverse direction and predefined for example by the sliding pin 115. By means of the pivoting relative to the drive carriage 110, the displacement slider 130 can be moved in the vertical direction Z.

The drive carriage 110 is held and guided displaceably in the guide rail 108, and extends linearly in the longitudinal direction X. The sliding pin 115 is arranged at an end of the drive carriage remote from the displacement slider 130. At an opposite end of the drive carriage nearest the displacement slider 130, the drive carriage is connected to the locking element 127.

The lever slotted guide 116 has a course 126 which has the rising region 113 between the straight region 154 and a further straight region 155 of the lever slotted track 116 in the longitudinal direction X. From front to back in the longitudinal direction X, the lever slotted track 116 initially has the straight course 154 and then the rising region 113. At the rear end of the lever slotted track 116, the course 126 has the further straight region 155.

The straight region 154 and the further straight region 155 each run substantially in the longitudinal direction X, in particular when the deployment lever 109 is deployed, and are offset to one another in the vertical direction Z. The rising region 113 runs for example obliquely to the vertical direction Z and obliquely to the longitudinal direction X, in particular when the deployment lever 109 is deployed, in order to connect together the straight region 154 and the further straight region 155 which are arranged offset in the longitudinal direction X and in the vertical direction Z.

According to the exemplary embodiment of FIGS. 14 to 16, for example the support pin 118 and the displacement slider 130 are arranged in the second side region 123 of the deployment lever 109. The drive slotted guide 124, which is provided in the second side region 123 in the exemplary embodiment of FIGS. 1 to 10, can be omitted since the drive carriage 110 is coupled to the drive carriage 110 at the sliding pin 115, in order to transmit a movement of the drive carriage 110 to the deployment lever 109.

In the closed position, the further sliding pin 117 is arranged in the further straight region 155. In the closed position, the deployment lever 109 is secured and locked against accidental movement in the vertical direction Z by the engagement of the further sliding pin 117 in the further straight region 155 of the lever slotted track 116. A movement of the sliding pin 117 along the rising region 113 leads to a pivoting of the deployment lever 109 relative to the guide rail 108.

The arrangement 200 with the movement mechanism 151 described, in which the elongate deployment lever 109 is supported reliably on the guide rail 108 and also can be arranged relatively far back above the fixed roof element 129 by means of the protruding region 128, and the additional stability from the cover reinforcement 141 with the one-piece elongate mounting tabs 143, allows a displacement of the cover 103 far to the back in the open position and hence a large opening of the roof opening 102. The positioning of the cover 103 far back in the open position is reliably possible because of the good stability of the cover 103, the good support of the deployment lever 109 and the fact that the displacement slider 130 can be arranged comparatively far back. Comparatively little installation space is required for this.

LIST OF REFERENCE SIGNS

100 Vehicle
101 Vehicle roof
102 Roof opening
103 Cover
104 Windscreen
105 Bodywork
106 Front edge
107 Rear edge
108 Guide rail
109 Deployment lever
110 Drive carriage
111 First coupling
112 Second coupling
113 Rising region
114 Slotted track
115 Sliding pin
116 Lever slotted track
117 sliding pin
118 Support pin
119 Support slotted track
120 Connecting region
121 Longitudinal extent of cover
122 Side region
123 Side region
124 Drive slotted track
125 Drive pin
126 Course
127 Locking element
128 Protruding region
129 Fixed roof element
130 Displacement slider
131 Further drive carriage
132 Cover slotted track
133 Cover slider
134 Drive cable
140 Cover carrier
141 Cover reinforcement
142 Connection
143 Mounting tab
144, 145 Mounting interface
146 Length
147 Panel
148 Distance
149 Middle region
150 Cover arrangement
151 Movement mechanism
152, 153 Long sides
154 Straight region
155 Further straight region
200 Arrangement
X Longitudinal direction
Y Transverse direction
Z Height direction

The invention claimed is:

1. An arrangement for a vehicle roof with a roof opening, comprising:

a cover displaceable in a longitudinal direction for closing the roof opening, a guide rail which is arranged on the vehicle roof, a deployment lever with a displacement slider which is pivotable relative to the guide rail, wherein the cover is coupled to the displacement slider and, for opening the roof opening, are displaced in the longitudinal direction relative to the deployment lever and to the displacement slider, wherein the deployment lever has a first coupling to the guide rail and a second coupling to the guide rail, which are configured such that the deployment lever are displaced in portions relative to the guide rail in the longitudinal direction, wherein the second coupling has a lever slotted track in the deployment lever and a sliding pin on the guide rail which is guided in the lever slotted track, and wherein the second coupling is arranged between the first coupling and the displacement slider in the longitudinal direction.

2. The arrangement according to claim 1, having a drive carriage for pivoting the deployment lever, wherein the drive carriage is guided displaceably in the longitudinal direction in the guide rail and is coupled to the deployment lever.

3. The arrangement according to claim 2, wherein the deployment lever has a drive slotted track and the drive carriage has a drive pin which is guided in the drive slotted track in order to transfer a displacement of the drive carriage into a movement of the deployment lever.

4. The arrangement according to claim 2, wherein the drive carriage is pivotably coupled to a slide pin on the deployment lever so that the deployment lever and the drive carriage are rigidly coupled relative to one another in the longitudinal direction.

5. The arrangement according to claim 1, wherein the deployment lever has a support pin and the guide rail has a support slotted track, wherein when the deployment lever is in a deployed position, the support pin is arranged in the support slotted track in order to support the deployment lever in a vertical direction.

6. The arrangement according to claim 5, wherein the lever slotted track is arranged on the first side region and the support pin is arranged in the second side region.

7. The arrangement according to claim 1, wherein the deployment lever has a first side region and a second side region and a connecting region, wherein the connecting region connects together the first side region and the second side region wherein the guide rail is partially arranged between the first side region and the second side region.

8. The arrangement according to claim 7, wherein the displacement slider is arranged in the second side region.

9. The arrangement according to claim 1, wherein the lever slotted guide has a course which, in the longitudinal direction towards the displacement slider, firstly has a straight region and then a rising region.

10. The arrangement according to claim 9, wherein in the longitudinal direction towards the displacement slider, the course has a further straight region adjoining the rising region.

11. The arrangement according to claim 1, wherein the deployment lever has a form which, in the state ready for operation, is always longer in the longitudinal direction than in a transverse direction and a vertical direction, each of which run transversely to the longitudinal direction.

12. The arrangement according to claim 1, wherein in the longitudinal direction, the deployment lever has a protruding region which, when the cover is in the open position, protrudes over a fixed roof element in the longitudinal direction.

13. The arrangement according to claim 1, having a further drive carriage, wherein the cover has a cover slotted track at a front edge, which is remote from the deployment lever in the longitudinal direction when the cover is in the closed position, wherein the further drive carriage engages in the cover slotted track in order to displace the cover in the longitudinal direction.

14. The arrangement according to claim 13, wherein the drive carriage and the further drive carriage are coupled together in order to transmit a movement of the further drive carriage to the drive carriage, and wherein the drive carriage and the further drive carriage are decoupled from one another so that the further drive carriage are displaced in the longitudinal direction relative to the drive carriage.

15. A vehicle roof with a roof opening, having:

an arrangement according to claim 1, the cover, wherein the cover and the roof opening are dimensioned such that the roof opening are closed by the cover at a rear edge of the cover.

16. A vehicle roof with a roof opening, having:

an arrangement according to claim 1, the cover, a further cover, wherein in its opened position, the cover is arranged above the further cover, wherein the cover and the further cover and the roof opening are dimensioned such that the cover and the further cover can together be arranged in the roof opening.

* * * * *